United States Patent
Tanaka et al.

[11] Patent Number: 6,091,478
[45] Date of Patent: Jul. 18, 2000

[54] LIQUID CRYSTAL DISPLAY DEVICE USING LIQUID CRYSTAL HAVING FERRIELECTRIC PHASE BETWEEN SUBSTRATES AND METHOD FOR DRIVING THE SAME

[75] Inventors: Tomio Tanaka, Tokyo; Tetsushi Yoshida, Kanagawa-ken; Manabu Takei, Sagamihara; Jun Ogura, Fussa, all of Japan

[73] Assignee: Casio Computer Co., Ltd., Tokyo, Japan

[21] Appl. No.: 09/073,633

[22] Filed: May 6, 1998

[30] Foreign Application Priority Data

May 8, 1997 [JP] Japan ..................... 9-132989

[51] Int. Cl.⁷ .................................. C09K 19/02
[52] U.S. Cl. ........................... 349/184; 349/173
[58] Field of Search .................... 349/133, 173, 349/184, 182; 252/299.67, 299.61, 299.65

[56] References Cited

U.S. PATENT DOCUMENTS

| | | |
|---|---|---|
| 4,941,736 | 7/1990 | Taniguchi et al. ............... 350/350 |
| 5,151,804 | 9/1992 | Verhulst et al. ................. 359/56 |
| 5,214,523 | 5/1993 | Nito et al. ..................... 359/100 |
| 5,307,189 | 4/1994 | Nishiki et al. .................. 349/143 |
| 5,316,694 | 5/1994 | Murashiro et al. ............ 252/299.61 |
| 5,338,240 | 8/1994 | Kim ............................. 349/106 |
| 5,353,136 | 10/1994 | Escher ......................... 359/56 |
| 5,377,028 | 12/1994 | Yoshida et al. .................. 349/76 |
| 5,393,460 | 2/1995 | Okabe et al. ................. 252/299.65 |
| 5,436,037 | 7/1995 | Okabe et al. ..................... 428/1 |
| 5,534,190 | 7/1996 | Johno et al. . |
| 5,620,756 | 4/1997 | Bach et al. . |
| 5,631,752 | 5/1997 | Tanaka ......................... 349/173 |
| 5,728,864 | 3/1998 | Motoyama et al. . |
| 5,729,307 | 3/1998 | Koden et al. .................... 349/33 |
| 5,828,434 | 10/1998 | Koden et al. .................. 349/148 |
| 5,847,799 | 12/1998 | Tanaka et al. ................. 349/174 |
| 5,861,109 | 1/1999 | Goodby et al. . |

OTHER PUBLICATIONS

Jpn. J. Appl. Phys. vol. 36 (1997) pp. 6847–6852, Part 1, No. 11.

*Primary Examiner*—James A. Dudek
*Assistant Examiner*—Heidi L. Eisenhut
*Attorney, Agent, or Firm*—Frishauf, Holtz, Goodman, Langer & Chick, P.C.

[57] ABSTRACT

A liquid crystal layer is sealed between a pair of substrates on which opposite electrodes are formed. The liquid crystal layer is formed of a liquid crystal which exhibits an anti-ferroelectric phase while the liquid crystal is in a bulk state. When the liquid crystal is sealed between the substrates as the liquid crystal layer, the liquid crystal exhibits a ferrielectric phase wherein liquid crystal molecules aligned in a first state of being aligned in a first direction and liquid crystal molecules aligned in a second state of being aligned in a second direction are present in predetermined order. In accordance with the polarity and magnitude of a voltage applied between the opposite electrodes, the ratio of the number of liquid crystal molecules aligned in the first state to the number of liquid crystal molecules aligned in the second state varies such that the direction of the director of the liquid crystal layer varies continuously. Gradation display can be achieved by detecting a variation in the director through the use of a pair of polarization plates arranged in a crossed Nicols fashion.

15 Claims, 15 Drawing Sheets

(1 of 15 Drawing Sheet(s) Filed in Color)

FIG.13A GATE SIGNAL
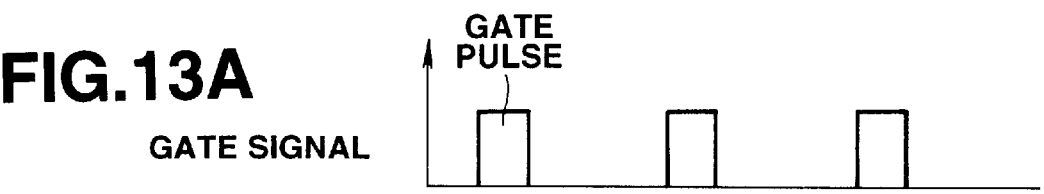
FIG.13B DATA SIGNAL
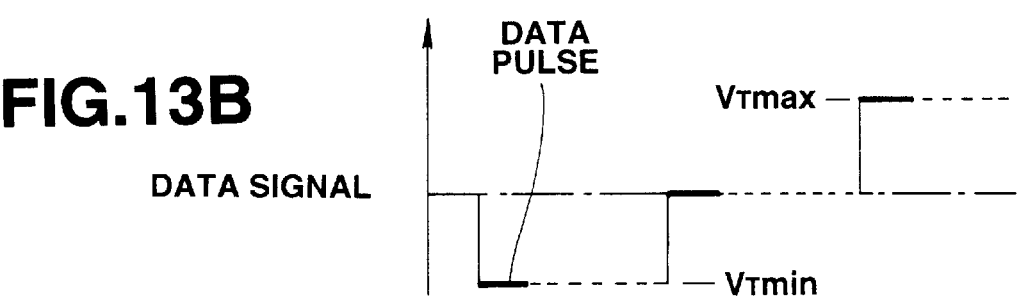
FIG.13C TRANSMITTANCE
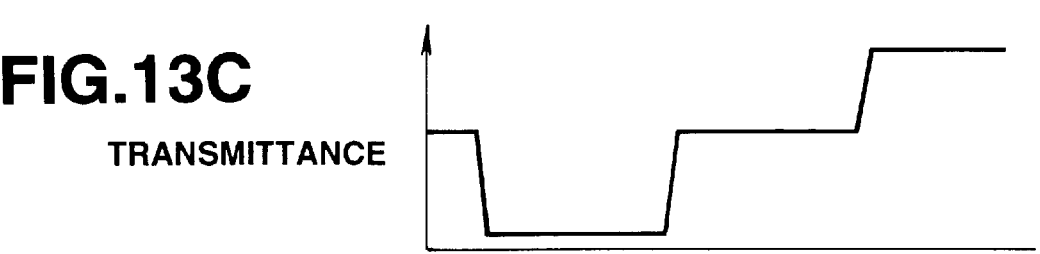

LIQUID CRYSTAL DISPLAY DEVICE USING LIQUID CRYSTAL HAVING FERRIELECTRIC PHASE BETWEEN SUBSTRATES AND METHOD FOR DRIVING THE SAME

BACKGROUND OF THE INVENTION

1. Field of the Invention

The present invention relates to an LCD (Liquid Crystal Display) device using an AFLC (AntiFerroelectric Liquid Crystal), and more particularly to an AFLC display device which is capable of performing gradation display and a method for driving the display device.

2. Description of the Related Art

A ferroelectric liquid crystal display device using an FLC (Ferroelectric Liquid Crystal) has received attention due to its quicker response and wider angle of visibility than those of a TN liquid crystal display device using a nematic liquid crystal.

Known FLC display devices include an FLC display device which uses an FLC and an AFLC display device which uses an AFLC.

An AFLC display device displays images through utilization of three stable alignment states which an AFLC has.

This matter will now be discussed in more detail. An AFLC has the first to third stable states in regard to the alignment of LC (Liquid Crystal) molecules; (1) in the first and second stable states, when a voltage equal to or higher than a first threshold value is applied to an AFLC, the liquid crystal exhibits a first ferroelectric phase wherein the LC molecules are aligned in a first direction or a second ferroelectric phase wherein the LC molecules are aligned in a second direction, in accordance with the polarity of the applied voltage; and (2) in the third stable alignment state, when a voltage equal to or lower than a second threshold value less than the first threshold value is applied to the AFLC, the liquid crystal exhibits an antiferroelectric phase which differs in the alignment of the liquid crystal molecules from the first and second ferroelectric phases. Determining the directions of the transmission axes of a pair of polarization plates arranged one on either side of an LCD device, on the basis of the optical axis of a liquid crystal layer while in the antiferroelectric phase, enables a display device to display images, with controlling a light transmittance in accordance with the applied voltage.

Even when a variation occurs in the applied voltage, an AFLC stays in the first/second ferroelectric phase or the antiferroelectric phase, as far as the value of the applied voltage lies in a range between the first and second threshold values. This property is known as a memory property. A conventional AFLC display device is driven in a simple matrix mode through utilization of this memory property.

The memory property of an AFLC is determined by a difference in magnitude between a voltage, which causes a phase transition from the first/second ferroelectric phase to the antiferroelectric phase in the liquid crystal, and a voltage which causes a phase transition from the antiferroelectric phase to the first/second ferroelectric phase in the liquid crystal. The greater difference between those voltages, the more excellent memory property. In other words, the more remarkable hysteresis of the optical characteristic of the liquid crystal, the more excellent memory property.

Due to this, a conventional AFLC display device which is driven in a simple matrix mode uses, as an AFLC, such a liquid crystal that the difference between the magnitudes of the above-described voltages is large.

However, the light transmittance of the conventional AFLC display device, which uses an AFLC having an excellent memory property, can hardly be controlled arbitrarily. That is, the control of a display gradation is almost impossible and multi-gradation display cannot be realized.

SUMMARY OF THE INVENTION

It is accordingly an object of the present invention to provide an AFLC display device which can achieve high-contrast gradation display.

According to the first aspect of the present invention having the above-described object, there is provided a liquid crystal display device comprising:

a first substrate on which first electrodes are formed;

a second substrate on which a second electrode is formed;

a liquid crystal layer formed by sealing, between the first and second substrates, an antiferroelectric liquid crystal which exhibits a chiral smectic phase while the liquid crystal is in a bulk state;

alignment means for aligning liquid crystal molecules of the liquid crystal layer to place the liquid crystal layer in a ferrielectric phase in which liquid crystal molecules, aligned in a first state of being aligned in a first direction, and liquid crystal molecules, aligned in a second state of being aligned in a second direction, are present in predetermined order in the liquid crystal layer; and means for applying a voltage between the first and second electrodes, thereby varying a direction of a director of the liquid crystal layer placed in the ferrielectric phase.

According to the above structure, due to the interaction between each of the alignment films and the liquid crystal, the liquid crystal layer sealed between the substrates exhibits the ferrielectric phase in which the liquid crystal molecules aligned in the first state and those aligned in the second state are present in predetermined order. Under the condition wherein no voltage is applied to the liquid crystal layer, the director of the liquid crystal layer in the ferrielectric phase represents an intermediate direction between the first and second directions. When a voltage is applied to the liquid crystal layer, the liquid crystal molecules are aligned in the first or second state in accordance with the applied voltage. The direction of the director of the liquid crystal layer varies continuously in accordance with the applied voltage. By detecting a variation in the direction of the director by means of a pair of polarization plates, the transmittance of the liquid crystal display device can be controlled in accordance with the applied voltage. This liquid crystal display device is designed so as to vary the direction of the director in the ferrielectric phase. In this case, the applied voltage determines the display gradation. By applying the liquid crystal layer with the voltage corresponding to the desired gradation, an image can be displayed at the desired gradation.

The alignment means, which places the liquid crystal layer in the ferrielectric phase, includes alignment films formed on the opposite inner surfaces of the substrates and having aligning forces to arrange antiferroelectric liquid crystal molecules in ferrielectric order. The liquid crystal molecules of the liquid crystal layer, which is formed of an antiferroelectric liquid crystal, are aligned in ferroelectric order due to the surface effect stemming from the interaction between each of those members which are in contact with the liquid crystal layer and the liquid crystal molecules.

In addition to the alignment films, the alignment means also includes means for setting the liquid crystal layer at a thickness necessary to have the aligning forces arrange the liquid crystal molecules in ferrielectric order. This structure ensures an improved stability to the ferrielectric phase. In order to realize the above-described liquid crystal display device, it is preferred that the magnitude of the aligning forces be nearly equal to the magnitude of intermolecular forces acting between the liquid crystal molecules. Moreover, it is preferred that the surface energy dispersion forces of the alignment films range from 30 to 50 dyn/cm, and that the van der Waals forces of the alignment films range from 3 to 20 dyn/cm.

Furthermore, it is preferred that:

the liquid crystal, while in the bulk state, exhibit a chiral smectic phase having a double helical structure;

the double helical structure break when the liquid crystal is sealed between the first and second substrates; and when a voltage equal to or higher than a predetermined value is applied to the liquid crystal layer, the liquid crystal layer exhibit a ferroelectric phase in which liquid crystal molecules of the liquid crystal layer are aligned in one of the first and second states in accordance with a polarity of the applied voltage.

The ratio of the number of liquid crystal molecules aligned in the first state to the number of liquid crystal molecules aligned in the second state within the liquid crystal layer is controlled in accordance with the applied voltage.

The direction of the director of the liquid crystal layer varies continuously in accordance with the applied voltage. This enables the gradation display to be achieved.

It is preferred that the liquid crystal display device further comprise active elements connected to the first electrodes or the second electrode, and driving means for applying a voltage to the liquid crystal layer in a manner of applying the voltage between the first and second electrodes through the active elements, thereby controlling a ratio of the number of liquid crystal molecules aligned in the first state to the number of liquid crystal molecules aligned in the second state and controlling the director of the liquid crystal layer in order to perform gradation display.

According to the above-described structure, the driving means applies a voltage to the liquid crystal layer through the active elements. The applied voltage is retained so as to keep the liquid crystal molecules aligned in the first or second state in accordance with the polarity and magnitude of the applied voltage. In this liquid crystal display device, the direction of the director of the liquid crystal layer varies continuously in accordance with the retained voltage. This ensures more reliable gradation display.

It is preferred that the driving means varies the direction of the director of the liquid crystal layer through an angle smaller than the maximum value of the cone angle formed between a cone traced by a molecule in a chiral smectic CA phase and the axis of the cone, in order to perform the gradation display in the ferrielectric phase without setting the liquid crystal layer in a ferroelectric phase.

According to the above-described structure, the gradation display is performed without setting the liquid crystal layer in a ferroelectric phase. Consequently, the display burning phenomenon is suppressed, and a high display screen contrast and a high image quality are attained.

According to the second aspect of the present invention, there is provided a liquid crystal display device comprising:

a first substrate on which first electrodes arranged in a matrix pattern are formed;

a second substrate on which at least one second electrode is formed facing the first electrodes;

a liquid crystal layer having spontaneous polarization and sealed between the first and second substrates, the liquid crystal layer being formed of a liquid crystal which exhibits a chiral smectic CA phase while the liquid crystal is in a bulk state, and whose liquid crystal molecules are aligned in one of first and second states when the liquid crystal is sealed between the first and second substrates; and alignment films arranged each on one of opposite surfaces of the first and second substrates and having aligning forces to align the liquid crystal molecules in the first and second states in order to place the liquid crystal layer in a ferrielectric phase.

According to the above-described structure, due to the interaction between each of the alignment films and the liquid crystal, the liquid crystal layer exhibits the ferrielectric phase under the condition wherein no voltage is applied to the liquid crystal layer. In the ferrielectric phase, the director of the liquid crystal layer represents an intermediate direction between the first direction and the second direction. When a voltage is applied to the liquid crystal layer, the liquid crystal molecules are aligned in the first or second direction in accordance with the applied voltage. The direction of the director of the liquid crystal layer varies continuously in accordance with the magnitude and polarity of the applied voltage. Under this condition, the applied voltage determines the direction of the director. By controlling the voltage which is applied to the liquid crystal layer, the direction of the director can be controlled to the desired direction.

It is preferred that the magnitude of the aligning forces of the alignment films be nearly equal to the magnitude of intermolecular forces acting between the liquid crystal molecules.

The above-described liquid crystal display device further comprises driving means for applying a voltage to the liquid crystal layer in a manner of applying the voltage between the first and second electrodes, thereby controlling a ratio of the number of liquid crystal molecules aligned in the first state to the number of liquid crystal molecules aligned in the second state and controlling a director of the liquid crystal layer in order to perform gradation display.

According to the above-described structure, the ratio of the number of liquid crystal molecules aligned in the first state to the number of liquid crystal molecules aligned in the second state is controlled in accordance with the polarity and magnitude of the voltage applied by the driving means. Under this condition, the direction of the director of the liquid crystal layer varies continuously in accordance with the applied voltage. This enables the liquid crystal display device to perform the gradation display.

It is preferred that that the driving means varies the direction of the director of the liquid crystal layer through an angle smaller than the maximum value of the cone angle formed between the cone traced by a molecule in a chiral smectic CA phase and the axis of the cone, thereby to perform the gradation display without causing a phase transition from the ferrielectric phase to a ferroelectric phase in the liquid crystal layer.

According to the third aspect of the present invention, there is provided a method for driving a liquid crystal display device, comprising steps of:

sealing a liquid crystal layer between first and second substrates, the liquid crystal layer being formed of a liquid crystal which exhibits a chiral smectic CA phase while the liquid crystal is in a bulk state and which exhibits, when the liquid crystal is sealed between the first and second substrates, a ferrielectric phrase in which liquid crystal molecules, aligned in a first state of being aligned in a first direction, and liquid crystal molecules, aligned in a second state of being aligned in a second direction, are present in the liquid crystal layer; and applying a voltage to the liquid crystal layer, thereby controlling a ratio of the number of liquid crystal molecules aligned in the first state to the number of liquid crystal molecules aligned in the second state and controlling a director of the liquid crystal layer in order to perform gradation display.

According to the above-described structure, when a voltage is applied to the liquid crystal layer which exhibits the ferrielectric phase wherein the liquid crystal molecules aligned in the first state and those aligned in the second state are present in the liquid crystal layer, the ratio of the number of liquid crystal molecules aligned in the first state to the number of liquid crystal molecules aligned in the second state varies in accordance with the applied voltage. Under this condition, the direction of the director of the liquid crystal layer varies in accordance with the applied voltage, which permits the gradation display to be achieved.

It is preferred that the driving means varies the direction of the director of the liquid crystal layer through an angle smaller than the maximum value of the cone angle formed between a cone traced by a molecule in a chiral smectic CA phase and the axis of the cone, thereby to perform the gradation display without causing a phase transition from the ferrielectric phase to a ferroelectric phase in the liquid crystal layer.

According to the fourth aspect of the present invention, there is provided a gradation display method comprising steps of:

forming a liquid crystal layer having a predetermined thickness by sealing, between first and second substrates, a liquid crystal material which exhibits a chiral smectic CA phase while the liquid material is in a bulk state;

aligning, in first and second states, liquid crystal molecules of the liquid crystal layer through utilization of aligning forces of alignment films formed on inner surfaces of the first and second substrates, in order to place the liquid crystal layer in a ferrielectric phase in which liquid crystal molecules aligned in the first state and liquid crystal molecules aligned in the second state are present in the liquid crystal layer;

applying a voltage to the liquid crystal layer, thereby controlling a director of the liquid crystal layer; and displaying a gradation by detecting a variation in a direction of the director with polarization means.

BRIEF DESCRIPTION OF THE DRAWINGS

The file of this patent contains at least one drawing (photograph) executed in color. Copies of this patent with color drawing will be provided by the Patent and Trademark Office upon request and payment of the necessary fee.

FIGS. 13A to 13C are timing charts for explaining the AFLC display device driving method of the present invention;

DETAILED DESCRIPTION OF THE PREFERRED EMBODIMENTS

An AFLC display device according to one embodiment of the present invention and which can display halftone images will now be described with reference to the accompanying drawings.

Figure 1:
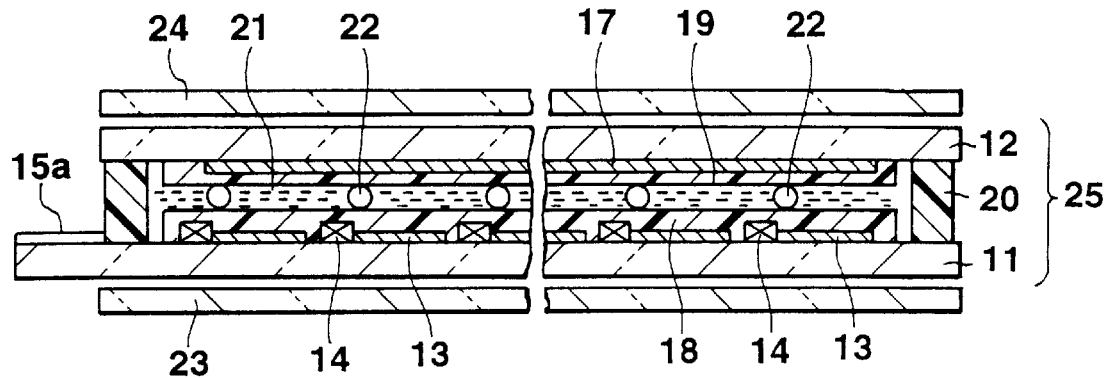
FIG. 1 is a diagram which illustrates a cross-sectional view showing the structure of a liquid crystal display device according to one embodiment of the present invention.

This AFLC display device is an active matrix type, and has a pair of transparent substrates (e.g., glass substrates) 11 and 12. In FIG. 1, transparent pixel electrodes 13 and active elements 14 connected thereto are arranged in a matrix pattern on the lower transparent substrate (hereinafter referred to as the lower substrate) 11.

The active elements 14 are formed of thin film transistors (hereinafter referred to as the TFTs 14), for example. Each of the TFTs 14 has a gate electrode formed on the lower substrate 11, a gate insulating film covering the gate electrode, a semiconductor layer formed on the gate insulating film, a source electrode formed on the semiconductor layer, and a drain electrode.

Figure 2:
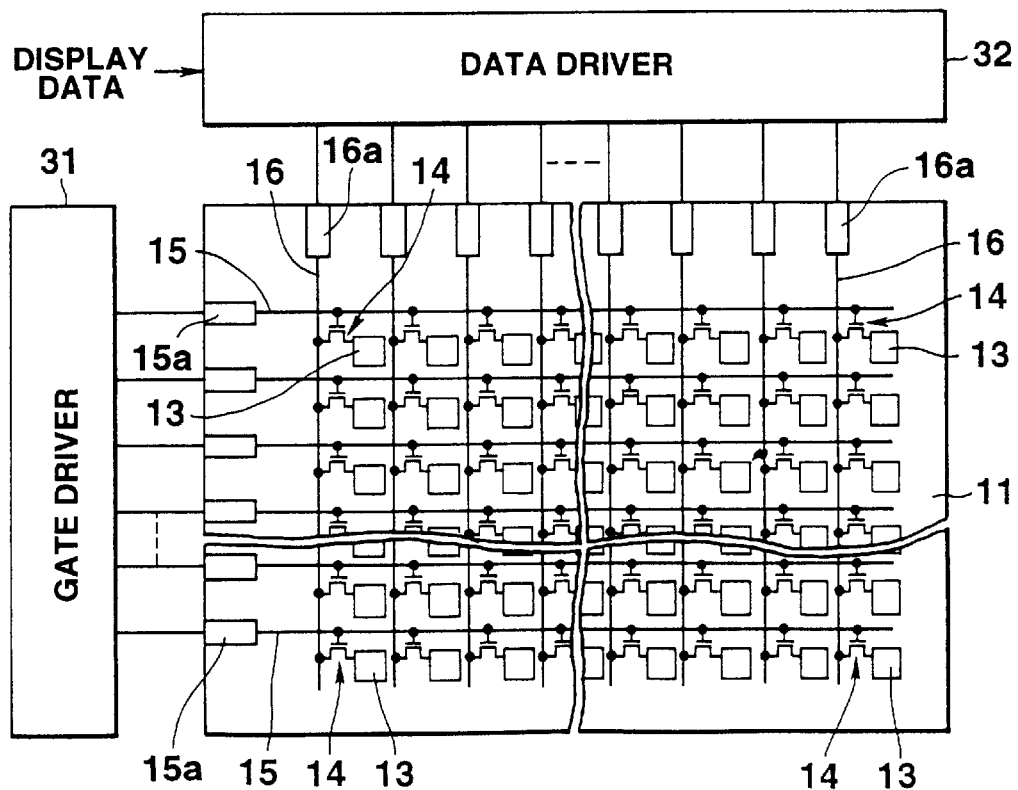
FIG. 2 is a diagram which illustrates a plan view showing the structure of the lower substrate of the liquid crystal display device illustrated in FIG. 1.

As illustrated in FIG. 2, gate lines (scanning lines) 15 are arranged between the rows of pixel electrodes 13, while data lines (gradation signal lines) 16 are arranged between the columns of pixel electrodes 13. The gate electrodes of the individual TFTs 14 are connected to their corresponding gate lines 15, and the drain electrodes of the TFTs 14 are connected to their corresponding data lines 16.

End portions 15a of the gate lines 15 are connected to a gate driver (row driver circuit) 31. End portions 16a of the data lines 16 are connected to a data driver (column driver circuit) 32. The gate driver 31 applies a gate signal (which will be described later) to the gate lines 15 in order to scan the gate lines 15. The data driver 32 receives display data (gradation data) and applies a data signal corresponding to the display data to the data lines 16.

The gate lines 15 are covered with the gate insulating film (transparent film) of the TFTs 14, except their end portions 15a. The data lines 16 are formed on the gate insulating film. The pixel electrodes 13 are made of ITO or the like, and are formed on the gate insulating film. Each pixel electrode 13 is connected at its one end portion to the source electrode of a corresponding one of the TFTs14.

In FIG. 1, a transparent common electrode 17, which faces the individual pixel electrodes 13 of the lower substrate 11, is formed on the upper transparent substrate (hereinafter referred to as the upper substrate) 12. The common electrode 17 is made of ITO or the like and is comprised of a single electrode extending over the entire display area. A reference voltage is applied to the common electrode 17. The pixel electrodes 13 and the common electrode 17 apply a voltage to an LC layer 21 sandwiched therebetween, thereby controlling the alignment direction of the LC molecules so that the direction of the director (the mean direction of the long axes) of the LC molecules varies continuously. By so doing, the optical axis of the LC layer is continuously controlled so as to control a display gradation.

Alignment films 18 and 19 are arranged one on each of those surfaces of the lower and upper substrates 11 and 12 on which the electrodes are formed.

The alignment films 18 and 19 are homogeneous alignment films which have undergone the alignment treatment of being rubbed in the same direction (the third direction 21C shown in FIG. 3 which will be discussed later), and have the aligning forces by which neighboring LC molecules are aligned substantially in the direction 21C of the alignment treatment.

The alignment films 18 and 19 are formed of an organic high molecular compound such as polyimide, and are approximately 25 nm to 35 nm in thickness. The surface energy dispersion forces (esd) of the alignment films 18 and 19, which have undertaken the alignment treatment such as rubbing, range from 30 to 50 dyn/cm, while the van der Waals forces (esp) of the alignment films 18 and 19 are relatively weak and range from 3 to 20 dyn/cm.

The lower substrate 11 and the upper substrate 12 are adhered to each other at their peripheral edge portions via a frame-shaped seal member 20. An LC cell 25 is formed by sealing the LC layer 21 in a region surrounded by the seal member 20 between the substrates 11 and 12. The thickness of the LC layer 21 is equal to or less than the natural pitch of the liquid crystal, and is set at approximately 1.5 microns. The thickness of the LC layer 21 is restricted by transparent spacers 22 which are arranged here and there in the region in which the LC layer 21 is sealed.

The LC layer 21 is formed of such an LC material that (1) in the bulk state, the LC material exhibits a chiral smectic CA (SmCA*) phase; (2) the LC material, when sealed between the substrates 11 and 12, exhibits a ferrielectric phase; and (3) the LC material, when sealed between the substrates 11 and 12 and applied with a satisfactorily high voltage, exhibits a ferroelectric phase in which the LC molecules are aligned substantially in the first direction 21A or second direction 21B shown in FIG. 3.

The details of the LC layer 21 will be discussed later.

Figure 3:
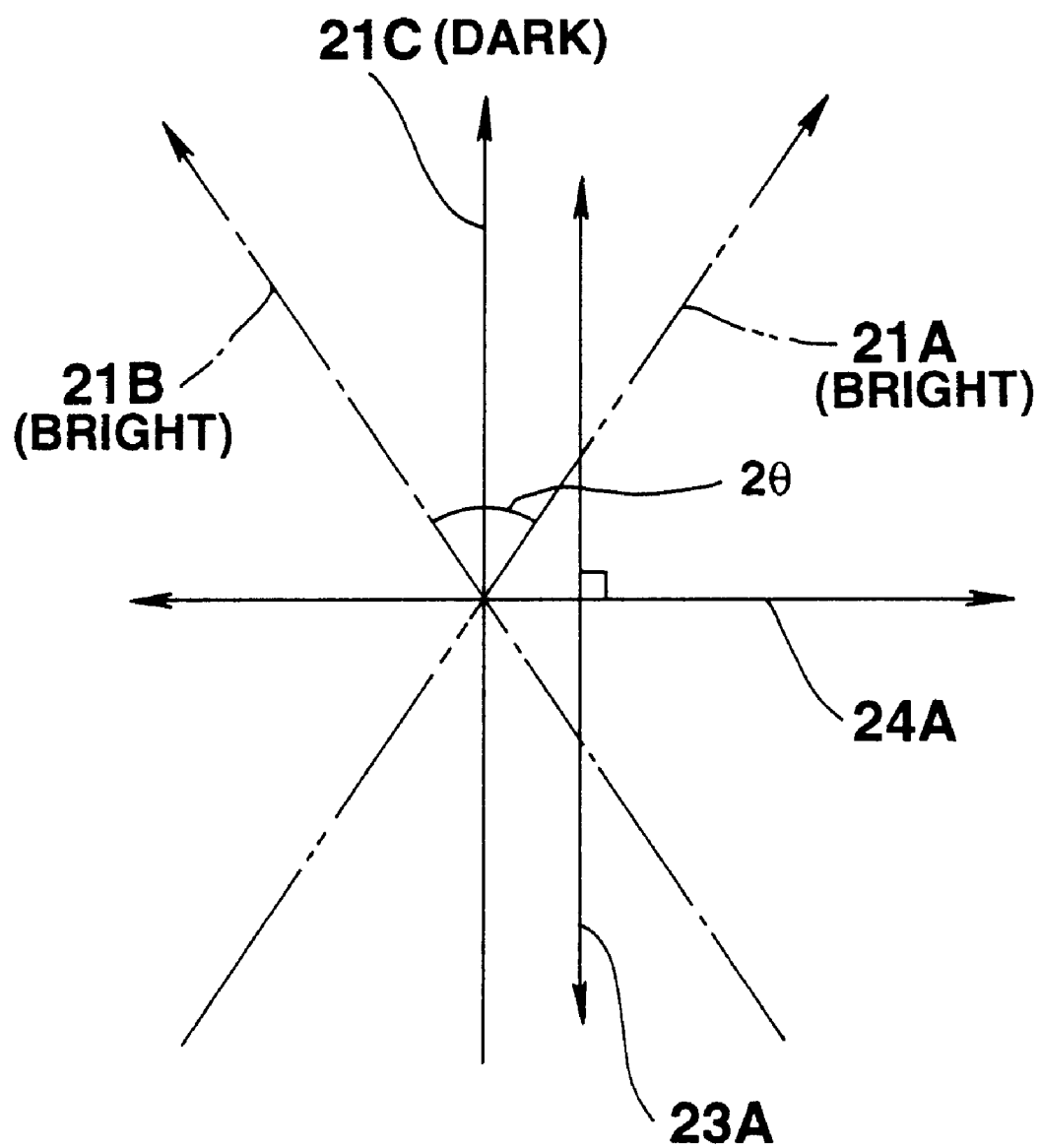
FIG. 3 is a diagram showing the relationship between the transmission axes of polarization plates and the alignment direction of liquid crystal molecules.

A pair of polarization plates 23 and 24 are arranged at the bottom and top of the LCD device. As shown in FIG. 3, the optical axis (hereinafter referred to as the transmission axis) 23A of the lower polarization plate 23 is set substantially parallel to a line normal to the smectic layers. The direction of the normal line is substantially coincident with the third direction 21C. The optical axis (hereinafter referred to as the transmission axis) 24A of the upper polarization plate 24 is set substantially perpendicular to the transmission axis 23A of the lower polarization plate 23.

The transmittance of the AFLC display device, whose polarization plates 23 and 24 have the transmission axes 23A and 24A set as shown in FIG. 3, becomes almost maximum (the display becomes brightest) when the director of the LC layer 21 represents substantially the first alignment direction 21A or the second alignment direction 21B. The transmittance becomes almost minimum (the display becomes darkest) when the director of the LC layer 21 represents substantially the third direction 21C.

More specifically, under the condition wherein the director of the LC layer represents the first direction 21A or the second direction 21B, a change occurs in the polarization state of the linearly polarized light which has passed through the light incident-side polarization plate 23 in parallel with the transmission axis 23A, due to the birefringence effect of the LC layer 21. The light whose polarization state has thus changed enters the light outgoing-side polarization plate 24. A component of the light which is parallel to the transmission axis 24A passes through the light outgoing-side polarization plate 24, and the display becomes bright as a result.

Under the condition wherein the director represents the third direction 21C, the linearly polarized light which has passed through the light incident-side polarization plate 23 in parallel with the transmission axis 23A is hardly susceptible to the birefringence effect of the LC layer 21. The linearly polarized light which has passed through the light incident-side polarization plate 23 passes as is through the LC layer 21, and is mostly absorbed by the light outgoing-side polarization plate 24, with the result that the display becomes dark.

When the LC layer 21 is optically in an intermediate state, the gradation according to the direction of the director is attained.

The alignment films 18 and 19 and the LC layer 21 will now be described in more detail.

The LC layer 21 is formed of a liquid crystal whose main component is, for example, a liquid crystal composition having the skeleton expressed in Chemical Formula 1. This liquid crystal has the properties shown in Table 1.

[Chemical Formula 1]

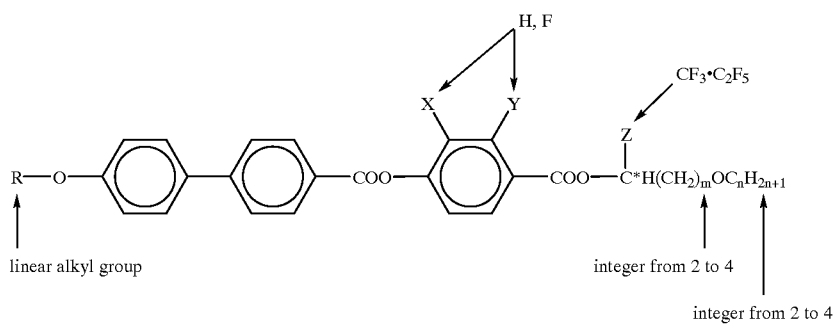

TABLE 1

| | |
|---|---|
| Phase transition sequence | Crystal - 30° C. - SmCA* - 69° C. - SmA - 80° C. - ISO |
| Spontaneous polarization | 229 nC/cm$^2$ |
| Cone angle θ | 32 degrees |
| Helical pitch | 1.5 microns |

The aforementioned cone angle is the angle which the axis of a cone traced by an LC molecule forms with the cone, and the first direction 21A and the second direction 21B form an angle of 2θ which is two times as large as the cone angle θ.

Figure 4:
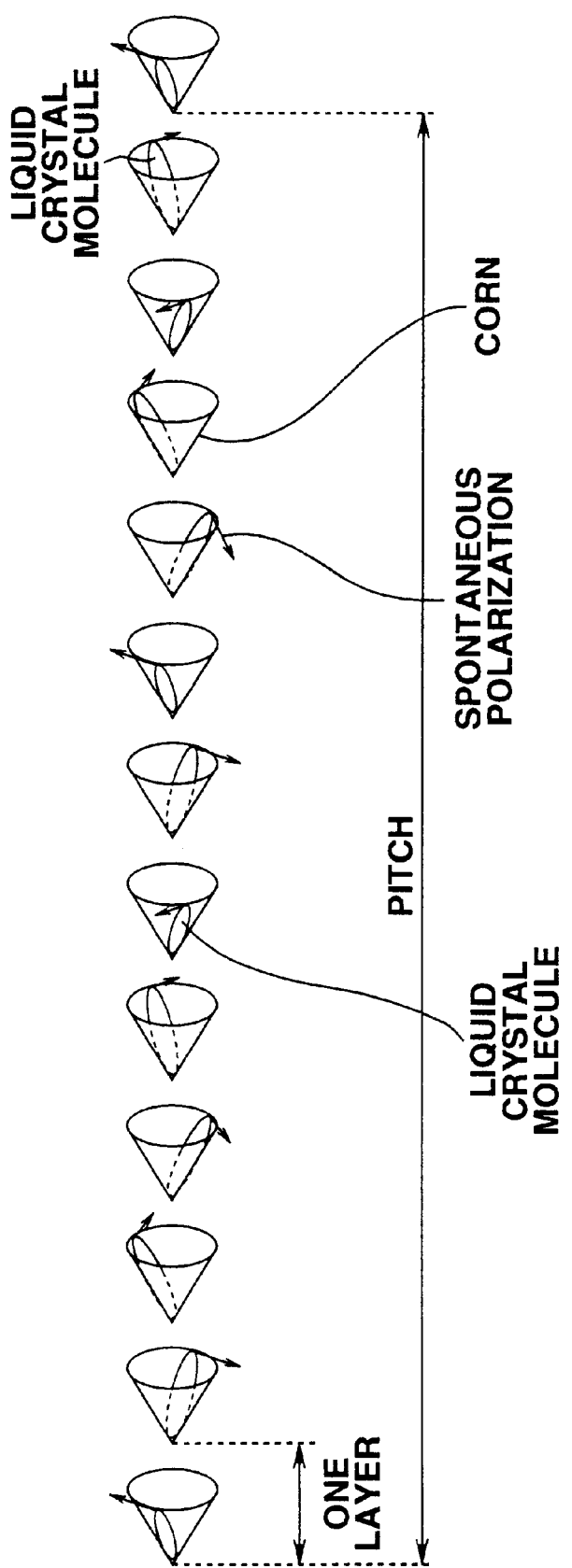
FIG. 4 is a diagram for explaining the double helical structure traced by molecules of a liquid crystal in a bulk state.

The LC material while in the bulk state comprises layers which are formed of aligned molecules, and has a helical structure as shown in FIG. 4. Adjoining LC molecules in each layer have such a double helical structure that they trace helixes shifted approximately 180 degrees on imaginary cones. The spontaneous polarizations of the LC molecules in adjoining smectic layers cancel out each other.

The above-described LC material is sealed between the upper substrate 12 and the lower substrate 11 so as to form the LC layer 21. The LC layer 21, sealed in the LC cell 25, is in the state wherein the double helical structure has vanished. This is because the LC layer 21 has a thickness of 1.5 microns which is nearly equal to 1 pitch (natural pitch) of the helical structure.

The aligning forces of the alignment films 18 and 19 are nearly equal to the intermolecular forces acting so as to maintain the antiferroelectric phase of the LC material forming the LC layer 21. A difference between the magnitude of the energy to antiferroelectrically align the molecules forming the LC material and that of the energy to ferroelectrically align the molecules is relatively small, and its threshold value is definite.

Due to this, when the double helical structure vanishes, the LC molecules are affected by the aligning forces, i.e., the surface effect occurring at the interface between the aligning films 18 and 19, and as a result, the LC molecules exhibit a ferrielectric phase in which half of them are aligned in the first direction and the other half of them are aligned in the second direction.

Figure 5:
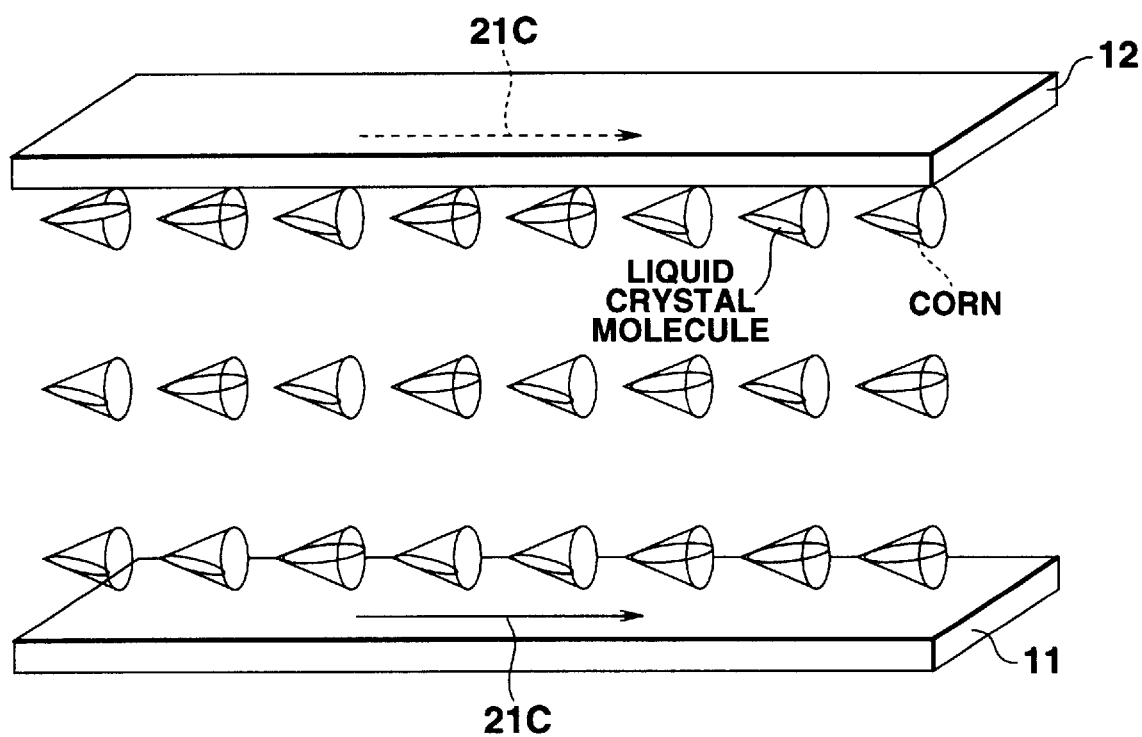
FIG. 5 is a diagram for explaining the state of the alignment of liquid crystal molecules in a ferrielectric phase.
Figure 6:
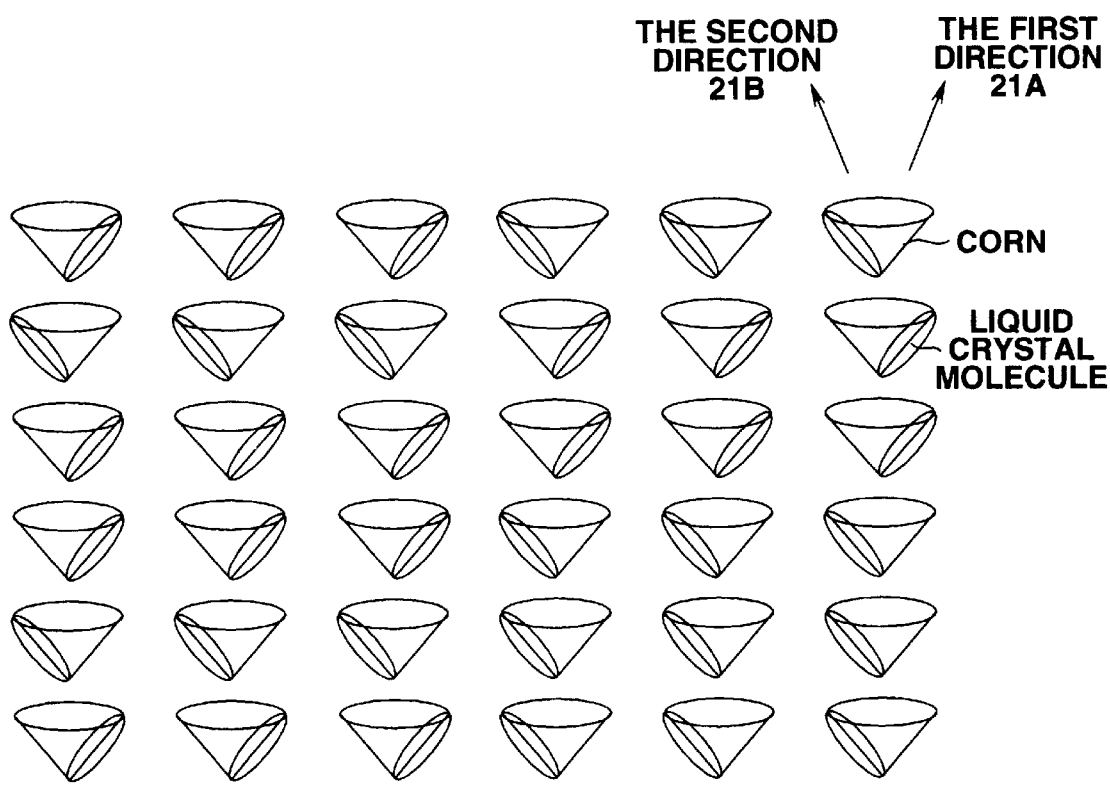
FIG. 6 is a diagram for explaining the state of the alignment of the liquid crystal molecules in the ferrielectric phase.

In the ferrielectric phase, as shown in FIG. 5 in perspective view and as illustrated in FIG. 6 in the form of a plan projected on a substrate surface, the LC molecules are arranged in predetermined order, with the long axis of each LC molecule being directed in the first direction 21A or the second direction 21B.

More specifically, in the ferrielectric phase, the LC molecules aligned in the first state of being aligned in the first direction and the LC molecules aligned in the second state of being aligned in the second direction are mingled in the LC layer 21. While no voltage is being applied to the LC layer 21, the LC molecules aligned in the first direction and those aligned in the second direction are mingled in equal percentages, under which condition the direction of the spatially mean director (optical axis) of the LC layer 21 is substantially coincident with the direction of the normal line of the smectic layers (or with the third direction 21C), as shown in FIG. 7(A).

Figure 7:
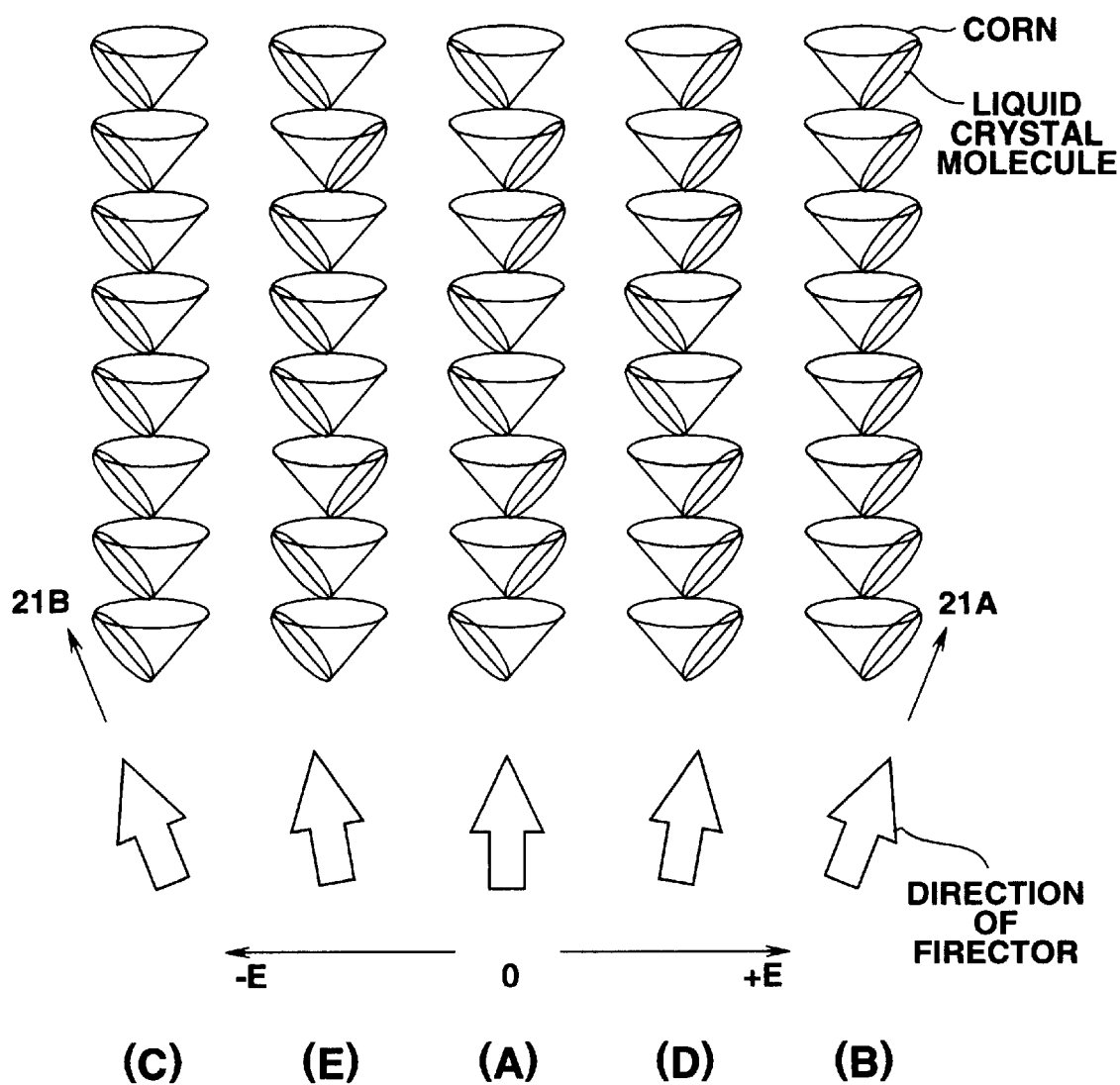
FIGS. 7A to 7E are diagrams showing the relationship between the applied voltage and the alignment of the liquid crystal molecules.

When a satisfactorily high voltage having a positive polarity (which is equal to or greater than a saturation voltage) is applied to the LC layer 21 which is in the ferrielectric phase and whose molecules are oriented as shown in FIG. 7(A), the LC molecules forming the LC layer 21 are aligned substantially in the first direction 21A as shown in FIG. 7(B). In this case, the spontaneous polarizations of the LC molecules are directed almost in the same direction, and the LC exhibits the first ferroelectric phase.

On the other hand, when a satisfactorily high voltage having a negative polarity (which is equal to or less than the saturation voltage) is applied to the LC layer 21, the LC molecules forming the LC layer 21 are aligned substantially in the second direction 21B as shown in FIG. 7(C). In this case, the spontaneous polarization of the LC molecules are directed almost in the same direction, and the LC exhibits the second ferroelectric phase.

Under the above-described conditions, the optical axis of the LC layer 21 extends substantially in the same direction as the first direction 21A or the second direction 21B.

Figure 8:
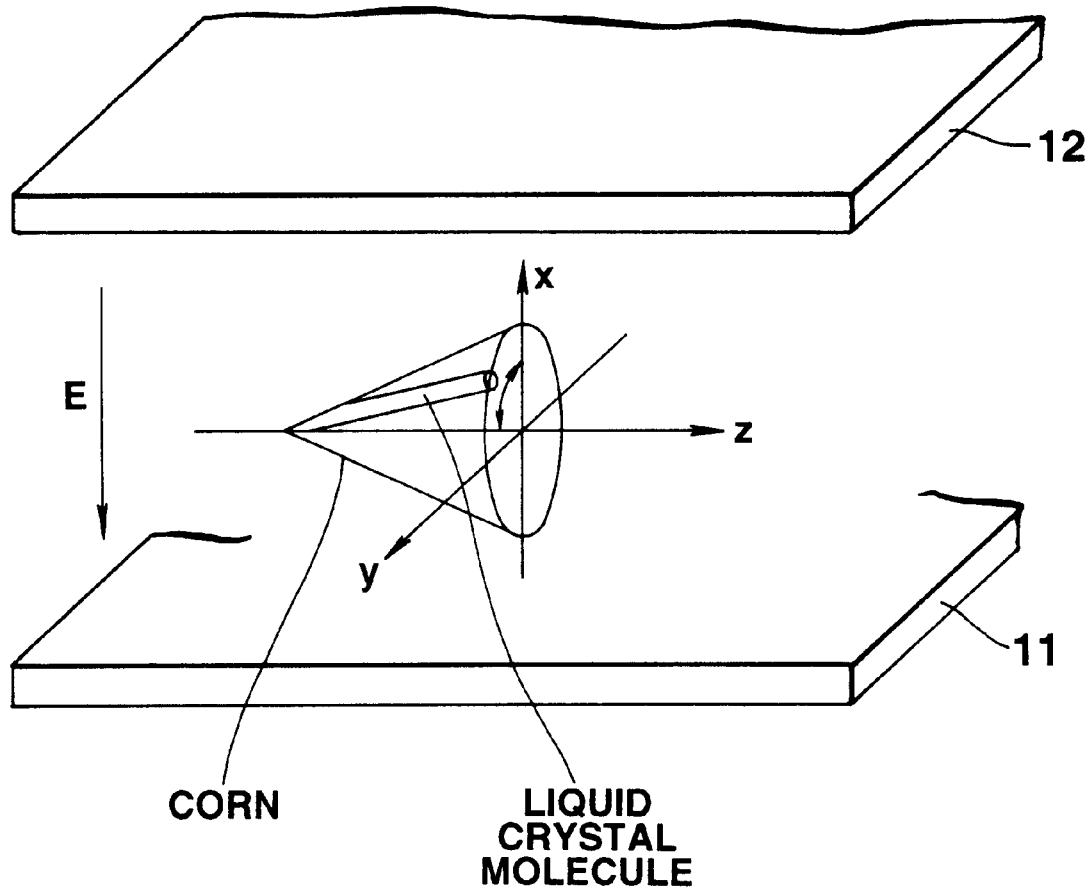
FIG. 8 is a diagram for explaining the behavior of the liquid crystal molecules when a voltage is applied to the liquid crystal.

When an intermediate voltage is applied to the LC layer 21 and is intensified/lowered, some LC molecules move along cones traced by molecules in the chiral smectic CA phase as shown in FIG. 8, in accordance with the polarity of the voltage, and the alignment direction is reversed. Due to this, as shown in FIG. 7(D) or 7(E), the number of LC molecules aligned in the first direction 21A or the second direction 21B decreases, while the number of LC molecules aligned in the second direction 21B or the first direction 21A increases. Accordingly, the ratio of the number of LC molecules aligned in the first state of being aligned in the first direction 21A to the number of LC molecules aligned in the second state of being aligned in the second direction 21B varies continuously in accordance with the polarity and value of the applied voltage.

As a result, the direction of the director (mean alignment direction of the LC molecules) of the LC layer 21 varies continuously between the first direction 21A and the second direction 21B in accordance with the applied voltage.

Because of the above, the optical characteristic of this LCD device, when shown in the form of a graph, does not trace a horizontal line in the vicinity of an applied voltage of 0V, and varies smoothly in accordance with increases in the absolute value of the applied voltage. The curve representing the optical characteristic when positive voltages are applied to the LC layer and the curve representing the optical characteristic when negative voltages are applied to the LC layer are symmetrical. Furthermore, in the case where a voltage whose absolute value is equal to or greater than that of the saturation voltage is applied to the LC layer, the transmittance becomes saturated.

Figure 9A:
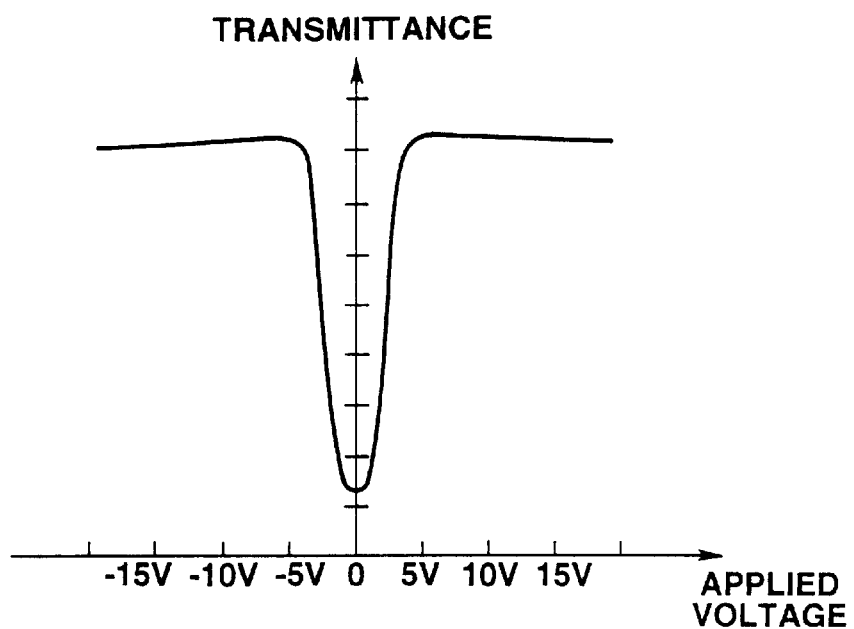
FIG. 9A is a graph showing the relationship between the applied voltage and the transmittance when a low frequency voltage having a rectangular waveform is applied to the liquid crystal display device of Example 1 (according to the present invention) which employs the optical arrangement illustrated in FIG. 3.

FIG. 9A shows an example of the relationship between the transmittance and the rectangular-waveform voltage applied to the LC layer of the LCD device of this embodiment (Example 1).

The LC layer 21 of the LCD device of Example 1 is formed of a liquid crystal whose main component is a liquid crystal composition which has been attained by processing the liquid crystal composition having the skeleton expressed in Chemical Formula 1 and having the properties shown in Table 1. The LC layer 21 is sealed with the cell gap being set at 1.5 microns and in the state wherein the helical structure traced by the LC molecules has been broken.

The alignment films 18 and 19 employed in the above LCD device are those which are formed of an organic high molecular compound such as polyimide, and which have been subjected to rubbing. The surface energy dispersion forces (esd) of the alignment films 18 and 19 range from approximately 38 to 41 dyn/cm, while the van der Waals forces (esp) range from approximately 9 to 14 dyn/cm.

Figure 9B:
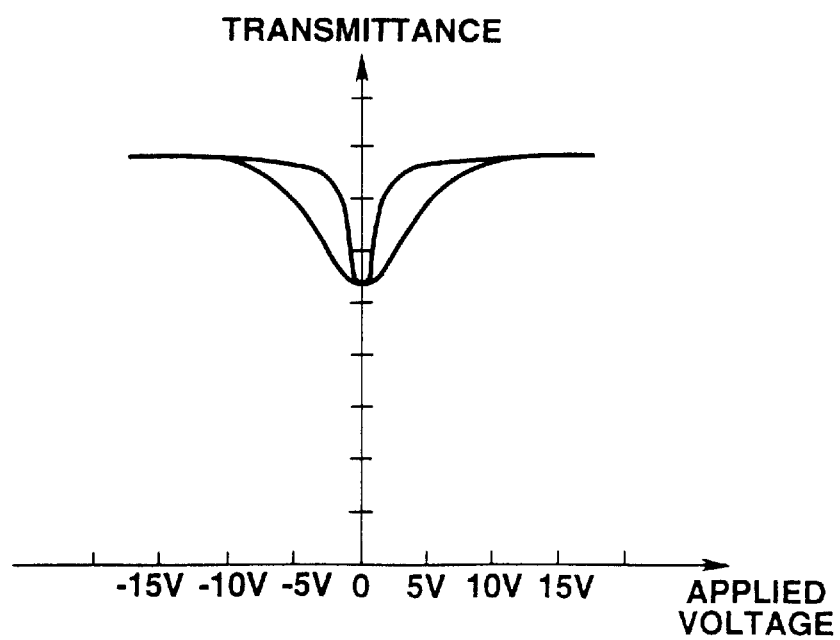
FIG. 9B is a graph showing the relationship between the applied voltage and the transmittance in Comparative Example 1 wherein a gap length is 5 microns.

FIG. 9B shows the relationship between the transmittance and the voltage applied to the LC layer included in the LCD device of Comparative Example 1. The LC layer of this LCD device is sealed with the cell gap being set at 5 microns and in the state wherein the helical structure traced by the LC molecules is maintained.

As seen from FIG. 9A, the applied voltage versus transmittance characteristic of the LCD device of Example 1 according to the present invention does not have a definite threshold value, and the transmittance varies continuously. The curve representing the characteristic when positive voltages are applied to the LC layer and the curve representing the characteristic when negative voltages are applied to the LC layer are symmetrical, the hysteresis is very minor, and the contrast (a difference between the minimum transmittance and the maximum transmittance) is high. Applied voltages and transmittances are substantially in one-to-one correspondence with each other. This permits halftones to be reliably displayed, and enables high-contrast display images to be assuredly attained.

In contrast, the applied voltage versus transmittance characteristic of the LCD device of Comparative Example 1 has a threshold value, the hysteresis is remarkable, and the applied voltage versus transmittance characteristic is not smooth, as seen from FIG. 9B. Moreover, the contrast is low.

In the LCD device of Example 1, as discussed previously, the LC molecules behave in accordance with the applied voltage. This matter can be understood from, for example, the conoscope image shown in FIG. 10 and enlarged views of the display screen of the LCD device of Example 1.

Figure 10:
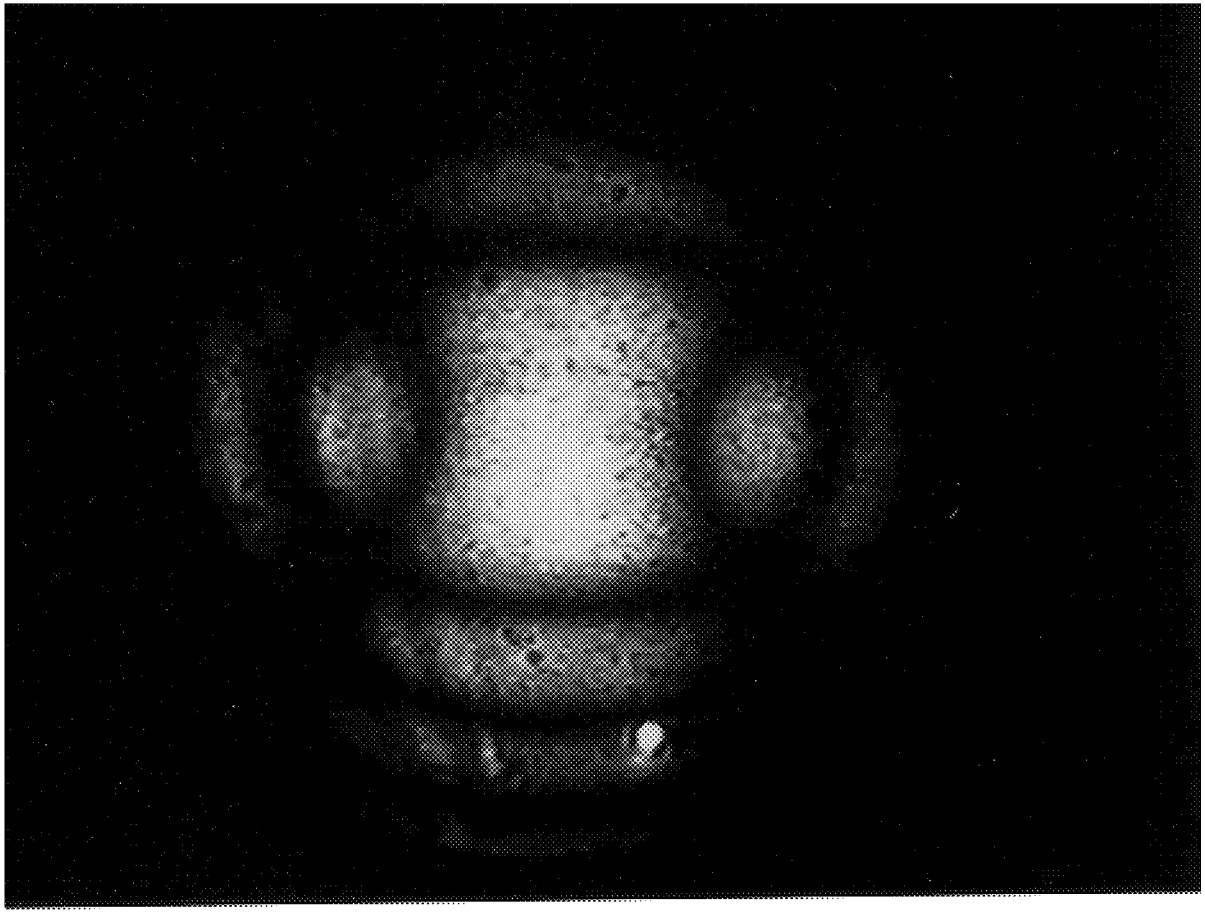
FIG. 10 is a photograph showing the conoscope image of the liquid crystal while in the bulk state.

FIG. 10 shows the conoscope image of the LC material while in the bulk state. In FIG. 10, two melanopes (bright spots) appear along an imaginary line which is nearly perpendicular to the arrow representing electric field E and which passes through the center of concentric isogyros (bright and dark rings), and are symmetric with respect to an imaginary line which is nearly parallel with the arrow of electric field E and which passes through the aforementioned center. These matters suggest that the LC molecules are in the antiferroelectric phase wherein the LC molecules trace the double helical structure.

While no voltage is being applied to the LC layer 21 which is formed of the LC material sealed between the substrates, almost the entire display screen is black. When a high voltage is applied to the LC layer 21, almost the entire display screen becomes white, which indicates that the LC molecules are aligned in the first or second direction. When an intermediate voltage is applied to the LC layer 21 and is intensified/lowered, variations in brightness and darkness occur in units of very small areas, and the brightness and darkness of the bright and dark areas change sequentially in accordance with the applied voltage. Thus, in accordance with the intermediate voltage, the orientations of the LC molecules vary area by area.

According to this embodiment, as discussed previously, the LC in the bulk state exhibits the antiferroelectric phase wherein the LC molecules have the double helical structure. Upon sealing the LC between the substrates 11 and 12 as the LC layer 21, the LC exhibits the ferrielectric phase. When an electric field is applied to the LC layer 21, the direction of the director of the LC layer 21 varies continuously between the first direction 21A and the second direction 21B in accordance with the applied voltage. This permits an image to be displayed reliably at the desired gradation.

In FIG. 3, the transmission axis 23A of the lower polarization plate 23 is arranged nearly parallel with the normal line of the smectic layers included in the LC layer 21, while the transmission axis 24A of the upper polarization plate 24 is arranged perpendicular to the transmission axis 23A. However, the arrangements of the transmission axes 23A and 24A of the lower and upper polarization plates 23 and 24 are arbitrary according to the electro-optical characteristic of the required LCD device.

For example, in the case of employing an LC material whose cone angle θ is on the order of 22.5 degrees, the transmission axis 23A of the lower polarization plate 23 can be arranged parallel with the second direction 21B, and the transmission axis 24A of the upper polarization plate 24 can be arranged perpendicular to the transmission axis 23A of the lower polarization plate 23, as illustrated in FIG. 1A. According to this structure, when a satisfactorily high voltage having a negative polarity (which is equal to or greater than the threshold value) is applied to the LC layer 21, the director represents the second direction 21B such that the display becomes darkest. On the other hand, when a satisfactorily high voltage having a positive polarity (which is equal to or greater than the threshold value) is applied to the LC layer 21, the director represents the first direction 21A such that the display becomes brightest.

Figure 11A:
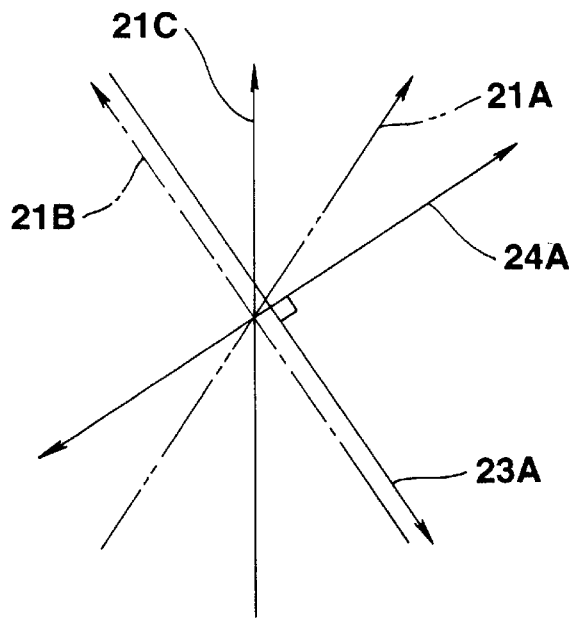
FIGS. 11A and 11B are diagrams showing other examples of the relationship between the transmission axes of the polarization plates and the alignment direction of the liquid crystal molecules.
Figure 11B:
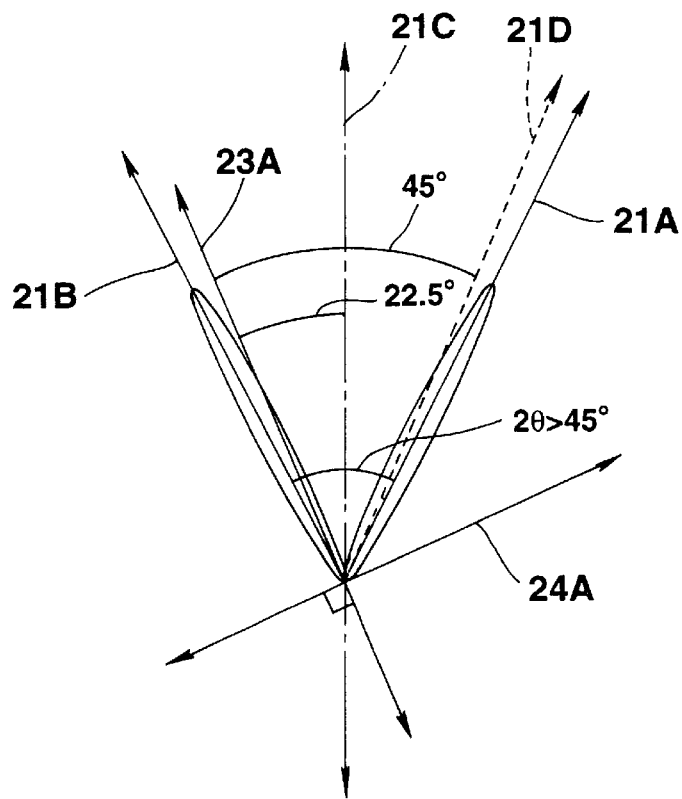

In the case of employing an LC material whose cone angle θ is larger than 22.5 degrees, the transmission axis of one polarization plate (the lower polarization plate 23 or the upper polarization plate 24) may be arranged so as to form an angle of 22.5 degrees with the normal line of the smectic layers of the LC layer 21, as illustrated in FIG. 11B. The second direction 21B, which serves as the director when the LC layer 21 exhibits an ferroelectric phase, may be determined so that an angle larger than 22.5 degrees but is smaller than the cone angle θ is formed between the second direction 21B and the normal line of the smectic layers of the LC layer 21. The transmission axis of the other polarization plate may be arranged substantially perpendicular to the transmission axis of the aforementioned one polarization plate. Employing this optical arrangement, the LC can be driven without setting the LC in a ferroelectric phase, with the result that the display burning phenomenon, etc. can be prevented from occurring, and the flicker can be suppressed.

For example, in the case of adopting an LC material whose cone angle is 32 degrees as shown in Chemical Formula 1, the transmission axis 23A of the lower polarization plate 23 is arranged so as to intersect the normal line of the smectic layers of the LC layer 21 at an angle of 22.5 degrees, for example (the direction of the normal line is substantially coincident with the direction 21C), as illustrated in FIG. 11B. The transmission axis 24A of the upper polarization plate 24 is arranged substantially perpendicular to the transmission axis 23A.

The amount of transmission light is controlled by applying between opposite electrodes a voltage lower than such a voltage as would cause the LC layer, formed of the above-described liquid crystal, to exhibit a ferroelectric phase, so that the direction of the director of the LC layer varies in a range defined between a direction (23A), which forms an angle of 22.5 degrees with the normal line of the smectic layers (the direction of the normal line is substantially coincident with the direction 21C), and a direction (21D) which forms an angle of 22.5 degrees with the normal line of the smectic layers.

According to the above structure, the display becomes darkest when the director represents the direction of the transmission axis 23A, and the display becomes brightest when the director represents the direction 21D which forms an angle of 45 degrees with the transmission axis 23A. In this case, it is not necessary to vary the direction of the director until it becomes coincident with the first direction 21A and the second direction 21B in order to attain the minimum to maximum gradations. In other words, the LC can be driven without setting the LC in a ferroeletric phase.

Even in the case where the above-described optical arrangement is employed, the relationship between the applied voltage and the behavior, phase transition, etc. of the molecules within the LC layer 21 is as discussed previously, and the direction of the director varies continuously between the first direction 21A and the second direction 21B. This permits an image to be displayed at the desired gradation. Furthermore, the flicker is reduced as compared to the case of the optical arrangement illustrated in FIG. 3, and the liquid crystal layer 21 is set in no ferroelectric phase. Therefore, the display burning phenomenon is suppressed, and high-contrast display images of an excellent quality are attained.

Figure 12A:
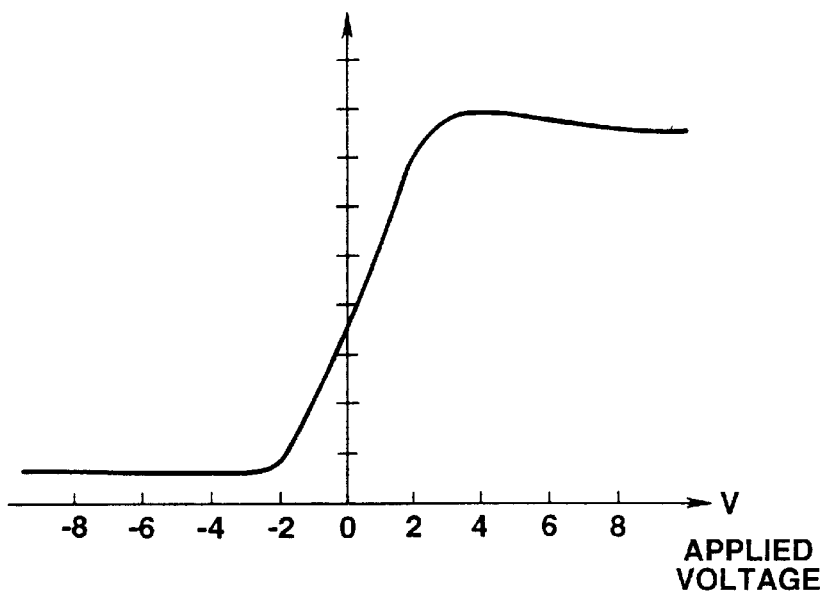
FIG. 12A is a graph showing the relationship between the applied voltage and the transmittance when a low frequency voltage having a rectangular waveform is applied to the liquid crystal display device of Example 2 (according to the present invention) which employs the optical arrangement illustrated in FIG. 11B.

FIG. 12A shows the applied voltage versus transmittance characteristic of the LCD device (Example 2 according to the present invention). In this LCD device, the optical arrangement illustrated in FIG. 11B is applied to the above-described LC cell (in which a liquid crystal, having the properties shown in Table 1 and containing as the main component a liquid crystal composition having the skeleton expressed in Chemical Formula 1, is sealed with the cell gap being set at 1.5 microns).

Figure 12B:
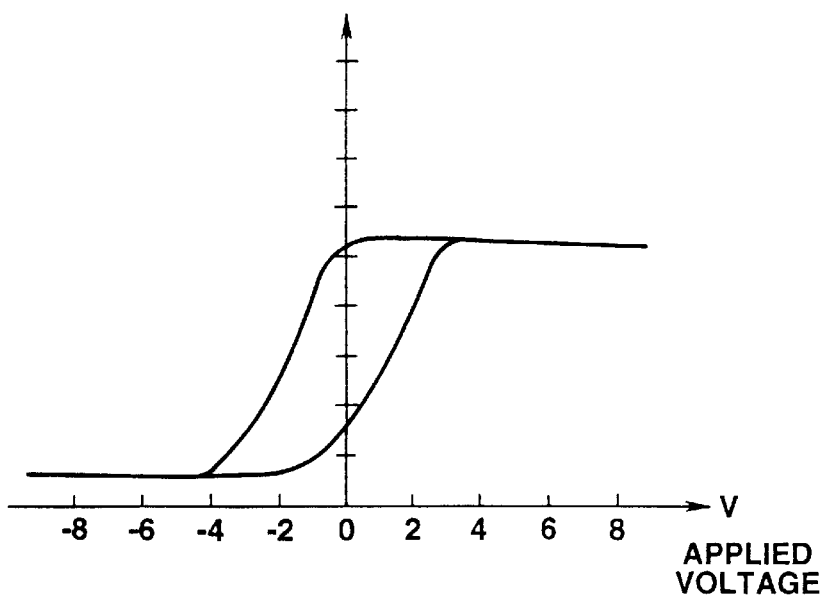
FIG. 12B is a graph showing the relationship between the applied voltage and the transmittance in Comparative Example 2 wherein the gap length is 5 microns.

FIG. 12B shows the applied voltage versus transmittance characteristic of an LCD device (Comparative Example 2) which is identical in structure with that of Example 2 according to the present invention, except that the cell gap is 5 microns.

The characteristics shown in FIGS. 12A and 12B are those obtained by applying a rectangular-waveform voltage between the electrodes 13 and the electrode 17 facing the electrodes 13.

As seen from FIG. 12A, the applied voltage versus transmittance characteristic of the LCD device of Example 2 according to the present invention does not have a definite threshold value, and the transmittance varies continuously. The curve representing the characteristic when positive voltages are applied to the LC layer and the curve representing the characteristic when negative voltages are applied to the LC layer are symmetrical, the hysteresis is minor, and the contrast is high. On the other hand, in the case of Comparative Example 2, the applied voltage versus transmittance characteristic has a threshold value, the hysteresis is considerable, and the applied voltage versus transmittance characteristic is not smooth, as seen from FIG. 12B. Moreover, the contrast is low.

It can be ascertained from FIGS. 12A and 12B that also the LCD device of Example 2 has an excellent display ability.

A method for driving the LCD devices of the present invention which are structured as explained above will now be described with reference to FIG. 13.

FIG. 13A shows a gate signal which the gate driver 31 applies to a gate line 15 in an arbitrary row, while FIG. 13B shows a data signal which the data driver 32 supplies to each data line 16 in synchronization with a gate pulse. The voltage of the data signal is set at such a value as would cause the LC layer 21 to exhibit no ferroelectric phase, i.e., at a voltage between VTmax and VTmin and corresponding to the transmittance to be attained. FIG. 13C shows variations in the transmittance which occur upon the application of data pulses shown in FIG. 13B.

Each gate signal becomes ON as a gate pulse in the selection period during which a corresponding row is selected. This gate pulse turns on the TFTs in the selected row. In the writing period during which the TFTs 14 are ON, the data signal corresponding to a display gradation is applied between the pixel electrodes 13 and the common electrode 17 facing the pixel electrodes 13. When the gate pulse becomes OFF, the TFTs 14 become OFF, and the voltage applied between the electrodes 13 and 17 until then is retained in pixel capacitors each being comprised of one electrode 13, the electrode 17 and the LC layer 21 sandwiched therebetween. As shown in FIG. 13C, the display gradation corresponding to the retained voltage is maintained until the selection period in which the next row is selected. Thus, according to this driving method, an image can be displayed at the desired gradation by controlling the voltage of a data pulse.

Figure 14:
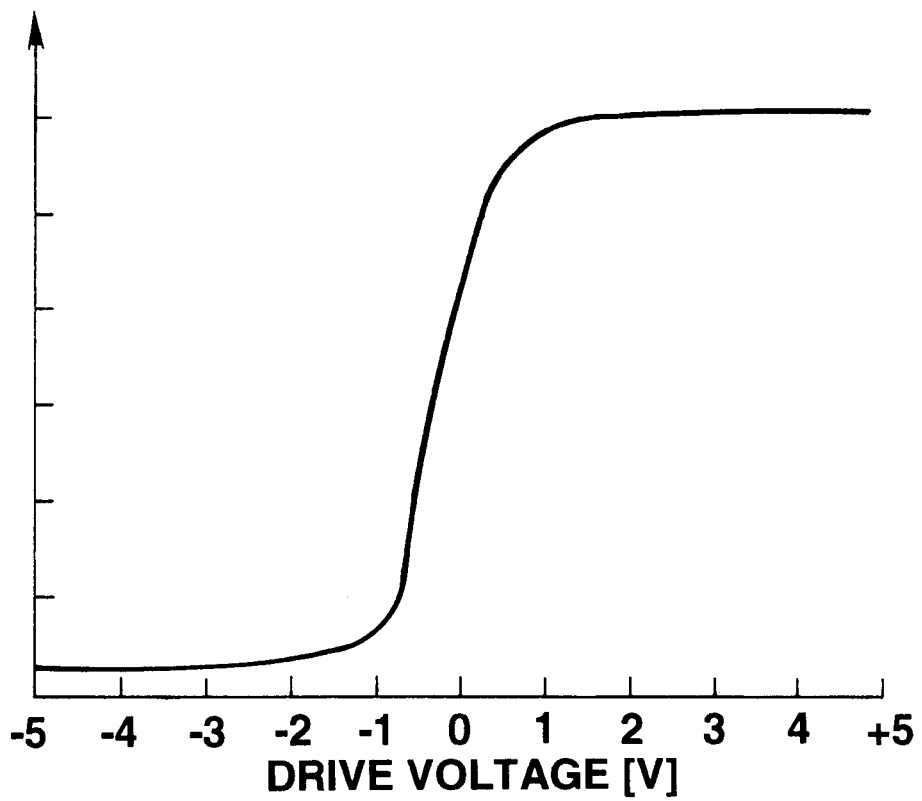
FIG. 14 is a diagram showing the relationship between the applied voltage and the transmittance when the liquid crystal display device of Example 2 according to the present invention is driven using the driving method shown in FIG. 13.

FIG. 14 shows variations in the transmittance when the LCD device of Example 2 is driven by the driving method shown in FIGS. 13A and 13B, and when the voltage of the data signal is increased sequentially from −5V to +5V and is lowered sequentially from +5V to −5V. It can be understood from FIG. 14 that an image can be reliably displayed at the desired gradation by employing the driving method shown in FIGS. 13A and 13B.

An example of the structure of the data driver 32, which makes such a drive possible, will now be described with reference to FIG. 15.

Figure 15:
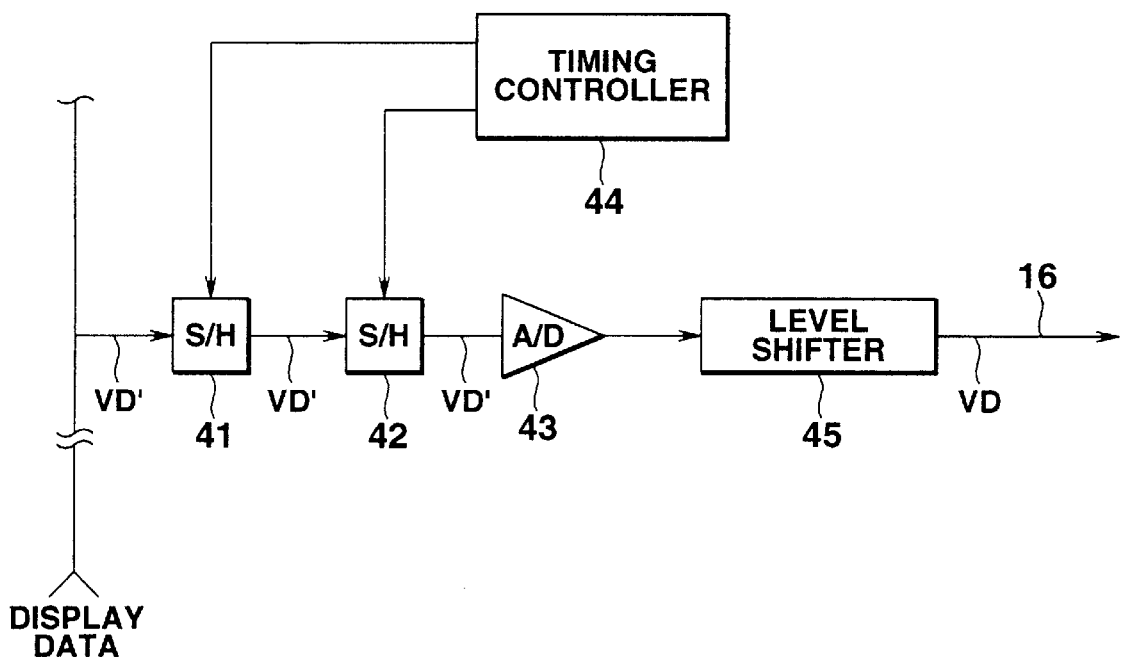
FIG. 15 is a block diagram exemplifying the structure of a driver circuit for accomplishing the driving method shown in FIG. 13.

As illustrated in FIG. 15, the data driver 32 includes a first sampling/holding circuit 41, a second sampling/holding circuit 42, an A/D (Analog/Digital) converter 43, a timing controller 44 and a level shifter 45.

The first sampling/holding circuit 41 samples/holds a signal component (one image data item) VD', for a corresponding pixel, of an externally supplied analog display signal. The second sampling/holding circuit 42 samples/holds the signal VD' held by the first sampling/holding circuit 41.

The A/D converter 43 converts the signal held by the second sampling/holding circuit 42 to digital gradation data.

In each selection period TS, the timing controller 44 supplies timing control signals as sampling/holding instructions to the first and second sampling/holding circuits 41 and 42.

The level shifter 45 converts the digital gradation data, output from the A/D converter 43, to a data pulse having a corresponding voltage VD (a voltage for a driving system and which is required to display the gradation designated by the digital gradation data), and outputs the data pulse to a corresponding one of the data lines 16. The level shifter 45 separates a power supply unit for a signal processing system and that for the driving system from each other. The voltage VD output from the level shifter 45 is applied to the LC layer 21 in the writing period during which the TFTs 14 in a corresponding row are ON, and is retained between the electrodes 13 and 17 while the TFTs 14 are OFF.

The first sampling/holding circuit 41, the second sampling/holding circuit 42, the A/D converter 43 and the level shifters 45 are arranged per column of pixels, while the timing controller 44 is arranged in common to a plurality of columns of pixels.

The structure of the data driver 32 is not limited to that illustrated in FIG. 15. For example, a sampling/holding circuit included in the A/D converter 43 may be used as the second sampling/holding circuit 42. The data output from the A/D converter 43 may be processed in a specific way, after which the processed data may be supplied to the level shifter 45 so as to be converted to the voltage for the driving system. The processed data may be converted to a gradation signal having a voltage for the signal processing system, and thereafter may be supplied to the level shifter 45 so as to be converted to the voltage for the driving system.

A variety of timing signals can be supplied from the outside of the data driver 32. Further, image data itself may be digital data.

The present invention is not limited to the above-described embodiment, and various modifications and applications are available.

For example, the antiferroelectric liquid crystal of the present invention is not limited to one whose main component is a liquid crystal composition having the skeleton shown in Chemical Formula 1, and any other liquid crystal can be employed insofar it exhibits the ferrielectric phase. The properties of the liquid crystal are also not limited to those described previously. The material, thickness, etc. of the alignment films can also be changed when needed.

Moreover, according to the above-described embodiment, the polarization plates 23 and 24 are arranged so that their transmission axes 23A and 24A are perpendicular to each other. However, the polarization plates 23 and 24 can be arranged so that their transmission axes are parallel with each other. Further, the optical axes of the polarization plates may be absorption axes.

Furthermore, the present invention is not limited to an AFLC display device which adopts TFTs as active elements, and is applicable also to an AFLC display device which adopts MIMs as active elements.

Figure 16:
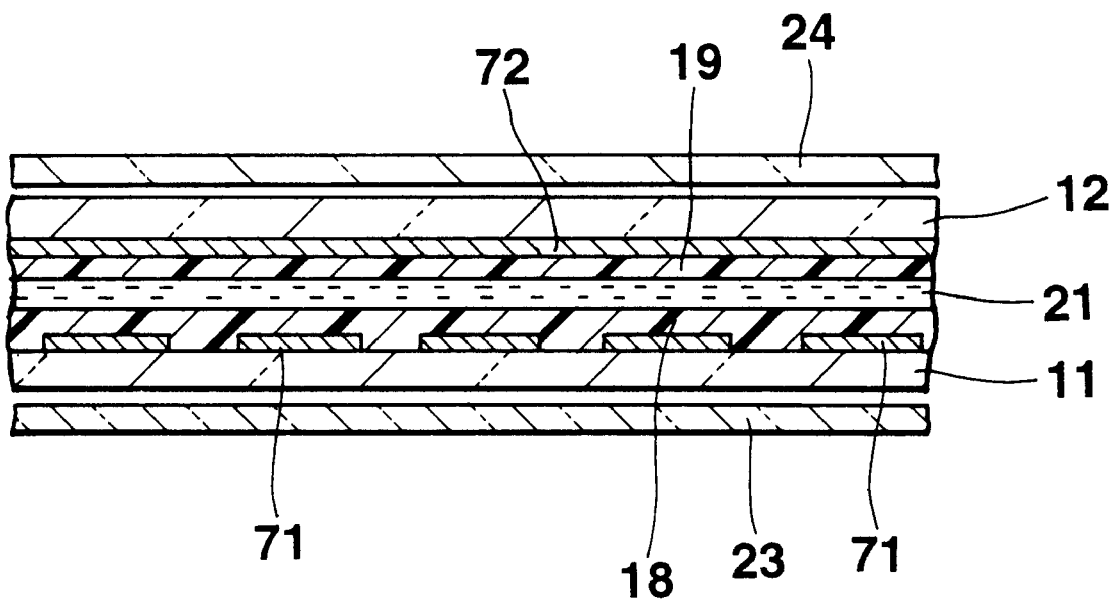
FIG. 16 is a diagram showing the structure of a simple matrix type liquid crystal display device.

The present invention is applicable also to a simple matrix (passive matrix) type display device in which scanning electrodes 71 and sign electrodes 72 perpendicular to the scanning electrodes 71 are arranged on the opposite surfaces of the substrates 11 and 12 facing each other, as illustrated in FIG. 16.

Although the LCD devices of the present invention employ an AFLC, they can continuously vary the display gradation in order to display an image at the desired gradation.

What is claimed is:

1. A liquid crystal display device comprising:

a first substrate on which first electrodes are formed;

a second substrate on which a second electrode is formed;

a liquid crystal layer formed by sealing, between said first and second substrates, an antiferroelectric liquid crystal which exhibits a chiral smectic phase while said liquid crystal is in a bulk state;

alignment means for aligning liquid crystal molecules of said liquid crystal layer to place said liquid crystal layer in a ferrielectric phase in which liquid crystal molecules, aligned in a first state of being aligned in a first direction, and liquid crystal molecules, aligned in a second state of being aligned in a second direction, are present in predetermined order in said liquid crystal layer; and means for applying a voltage between said first and second electrodes, thereby varying a direction of a director of said liquid crystal layer placed in said ferrielectric phase, wherein said crystal molecules of said liquid crystal layer of said antiferroelectric liquid crystal exhibiting a chiral smectic phase in a bulk state are aligned in a ferrielectric phase by said alignment means when said liquid crystal is sealed between said first and second substrates, and the direction of the director of the liquid crystal layer in the ferrielectric phase is changed by applying a voltage to the liquid crystal layer.

2. The liquid crystal display device according to claim 1, wherein said alignment means includes alignment films which have aligning forces to arrange antiferroelectric liquid crystal molecules in ferrielectric order.

3. The liquid crystal display device according to claim 1, wherein said alignment means includes alignment films which have aligning forces to arrange antiferroelectric liquid crystal molecules in ferrielectric order, and means for setting said liquid crystal layer at a thickness necessary to have said aligning forces arrange the liquid crystal molecules in ferrielectric order.

4. The liquid crystal display device according to claim 1, further comprising:

active elements connected to said first electrodes or said second electrode; and driving means for applying a voltage to said liquid crystal layer in a manner of applying the voltage between said first and second electrodes through said active elements, thereby controlling a ratio of the number of liquid crystal molecules aligned in said first state to the number of liquid crystal molecules aligned in said second state and controlling the director of said liquid crystal layer in order to perform gradation display.

5. The liquid crystal display device according to claim 4, wherein a cone traced by a molecule in a chiral smectic CA phase has an axis and forms a cone angle with said axis, and said driving means varies the direction of the director of said liquid crystal layer through an angle smaller than said cone angle, thereby to perform the gradation display without setting said liquid crystal layer in a ferroelectric phase.

6. A liquid crystal display device comprising:

a first substrate on which first electrodes are formed, a second substrate on which a second electrode is formed;

a liquid crystal layer formed by sealing, between said first and second substrates, an antiferroelectric liquid crystal which exhibits a chiral smectic phase while said liquid crystal is in a bulk state, alignment means for aligning liquid crystal molecules of said liquid crystal layer to place said liquid crystal layer in a ferrielectric phase in which liquid crystal molecules, aligned in a first state of being aligned in a first direction, and liquid crystal molecules, aligned in a second state of being aligned in a second direction, are present in predetermined order in said liquid crystal layer; and means for applying a voltage between said first and second electrodes, thereby varying a direction of a director of said liquid crystal layer placed in said ferrielectric phase, wherein said alignment means includes alignment films which have aligning forces to arrange antiferroelectric liquid crystal molecules in ferrielectric order, and surface energy dispersion forces of said alignment films range from 30 to 50 dyn/cm, and van der Waals forces of said alignment films range from 3 to 20 dyn/cm.

7. A liquid crystal display device comprising:

a first substrate on which first electrodes are formed, a second substrate on which a second electrode is formed;

a liquid crystal layer formed by sealing, between said first and second substrates, an antiferroelectric liquid crystal which exhibits a chiral smectic phase while said liquid crystal is in a bulk state, alignment means for aligning liquid crystal molecules of said liquid crystal layer to place said liquid crystal layer in a ferrielectric phase in which liquid crystal molecules, aligned in a first state of being aligned in a first direction, and liquid crystal molecules, aligned in a second state of being aligned in a second direction, are present in predetermined order in said liquid crystal layer; and means for applying a voltage between said first and second electrodes, thereby varying a direction of a director of said liquid crystal layer placed in said ferrielectric phase, wherein said alignment means includes alignment films which have aligning forces to arrange antiferroelectric liquid crystal molecules in ferrielectric order, and means for setting said liquid crystal layer at a thickness necessary to have said aligning forces arrange the liquid crystal molecules in ferrielectric order, said liquid crystal, while in the bulk state, exhibits a chiral smectic phase having a double helical structure, said double helical structure breaks when said liquid crystal is sealed between said first and second substrates, thereby said liquid crystal molecules are aligned in a ferrielectric phase by said alignment means when said liquid crystal is sealed between the substrates, and the direction of the director of said liquid crystal layer in the ferrielectric phase is changed by applying a voltage to said liquid crystal;

when a voltage equal to or higher than a voltage that causes saturation of changes in transmission rate corresponding to the applied voltage is applied to said liquid crystal layer, said liquid crystal layer exhibits a ferroelectric phase in which the liquid crystal molecules of said liquid crystal layer are aligned in one of said first and second states in accordance with a polarity of the applied voltage.

8. The liquid crystal display device according to claim 7, wherein a ratio of the number of liquid crystal molecules aligned in said first state to the number of liquid crystal molecules aligned in said second state within said liquid crystal layer is controlled in accordance with the applied voltage.

9. The liquid crystal display device according to claim 8, wherein when the liquid crystal molecules of said liquid crystal layer move in accordance with the applied voltage and along cones traced by molecules in a chiral smectic CA phase, a state of the alignment of the liquid crystal molecules changes from one of said first and second states to the other of said first and second states.

10. A liquid crystal display device comprising:

a first substrate on which first electrodes arranged in a matrix pattern are formed;

a second substrate on which at least one second electrode is formed facing said first electrodes;

a liquid crystal layer having spontaneous polarization and sealed between said first and second substrates, said liquid crystal layer being formed of a liquid crystal which exhibits a chiral smectic CA phase while said liquid crystal is in a bulk state, and whose liquid crystal molecules are aligned in one of first and second states when said liquid crystal is sealed between said first and second substrates; and alignment films arranged each on one of opposite surfaces of said first and second substrates and having aligning forces to align the liquid crystal molecules in said first and second states in order to place said liquid crystal layer in a ferrielectric phase;

wherein said liquid crystal molecules of said liquid crystal layer of said antiferroelectric liquid crystal exhibiting a chiral smectic phase in a bulk state are aligned in a ferrielectric phase by said alignment films when said liquid crystal is sealed between said first and second substrates, and a direction of a director in said liquid crystal layer in the ferrielectric phase is changed by a voltage applied thereto.

11. A liquid crystal display device comprising:

a first substrate on which first electrodes arranged in a matrix pattern are formed;

a second substrate on which at least one second electrode is formed facing said first electrodes;

a liquid crystal layer having spontaneous polarization and sealed between said first and second substrates, said liquid crystal layer being formed of a liquid crystal which exhibits a chiral smectic CA phase while said liquid crystal is in a bulk state, and whose liquid crystal molecules are aligned in one of first and second states when said liquid crystal is sealed between said first and second substrates; and alignment films arranged each on one of opposite surfaces of said first and second substrates and having aligning forces to align the liquid crystal molecules in said first and second states in order to place said liquid crystal layer in a ferrielectric phase; and driving means for applying a voltage to said liquid crystal layer in a manner of applying the voltage between said first and second electrodes, thereby controlling a ratio of the number of liquid crystal molecules aligned in said first state to the number of liquid crystal molecules aligned in said second state and controlling a director of said liquid crystal layer in order to perform gradation display;

wherein said liquid crystal molecules of said liquid crystal layer of said antiferroelectric liquid crystal exhibiting a chiral smectic phase in a bulk state are aligned in a ferrielectric phase by said alignment films when said liquid crystal is sealed between said first and second substrates, and a direction of the director of said liquid crystal layer is changed by applying a voltage thereto.

12. The liquid crystal display device according to claim 11, wherein a cone traced by a molecule in a chiral smectic CA phase has an axis and forms a cone angle with said axis, and said driving means varies a direction of the director of said liquid crystal layer through an angle smaller than said cone angle, thereby to perform the gradation display in the ferrielectric phase, without causing a phase transition in said liquid crystal layer.

13. A method for driving a liquid crystal display device, comprising steps of:

sealing a liquid crystal layer between first and second substrates, said liquid crystal layer being formed of a liquid crystal which exhibits a chiral smectic CA phase while said liquid crystal is in a bulk state and which exhibits, when said liquid crystal is sealed between said first and second substrates, a ferrielectric phase in which liquid crystal molecules, aligned in a first state of being aligned in a first direction, and liquid crystal molecules, aligned in a second state of being aligned in a second direction, are present in said liquid crystal layer; and applying a voltage to said liquid crystal layer, thereby controlling a ratio of the number of liquid crystal molecules aligned in said first state to the number of liquid crystal molecules aligned in said second state and controlling a director of said liquid crystal layer in order to perform gradation display;

wherein said liquid crystal molecules are of said liquid crystal layer of an antiferroelectric liquid crystal exhibiting a chiral smectic phase in a bulk state are aligned in a ferrielectric chase by alignment films when said liquid crystal layer is sealed between the first and second substrates and a direction of the director of said liquid crystal layer in the ferrielectric phase is changed by applying a voltage thereto.

14. A method for driving a liquid crystal display device, comprising steps of:

sealing a liquid crystal layer between first and second substrates, said liquid crystal layer being formed of a liquid crystal which exhibits a chiral smectic CA phase while said liquid crystal is in a bulk state and which exhibits, when said liquid crystal is sealed between said first and second substrates, a ferrielectric phase in which liquid crystal molecules, aligned in a first state of being aligned in a first direction, and liquid crystal molecules, aligned in a second state of being aligned in a second direction, are present in said liquid crystal layer; and applying a voltage to said liquid crystal layer, thereby said liquid crystal molecules of said liquid crystal layer of antiferroelectric liquid crystal exhibiting a chiral smectic phase in a bulk state are aligned in a ferrielectric phase when said liquid crystal layer is sealed between the first and second substrates, a direction of a director of said liquid crystal layer is changed by applying a voltage thereto and controlling a ratio of the number of liquid crystal molecules aligned in said first state to the number of liquid crystal molecules aligned in said second state and controlling a director of said liquid crystal layer in order to perform gradation display;

wherein a cone traced by a molecule in a chiral smectic CA phase has an axis and forms a cone angle with said axis, and said driving means varies a direction of the director of said liquid crystal layer through an angle smaller than said cone angle, thereby to perform the gradation display in the ferrielectric phase, without causing a phase transition in said liquid crystal layer.

15. A gradation display method comprising steps of:

forming a liquid crystal layer having a predetermined thickness by sealing, between first and second substrates, a liquid crystal material which exhibits a chiral smectic CA phase while said liquid material is in a bulk state;

aligning, in first and second states, liquid crystal molecules of said liquid crystal layer through utilization of aligning forces of alignment films formed on inner surfaces of said first and second substrates, in order to place said liquid crystal layer in a ferrielectric phase in which liquid crystal molecules aligned in said first state and liquid crystal molecules aligned in said second state are present in said liquid crystal layer;

applying a voltage to said liquid crystal layer, thereby controlling a director of said liquid crystal layer; and displaying a gradation by detecting a variation in a direction of said director with polarization means, wherein said liquid crystal molecules of said liquid crystal layer of an anitiferroelectric liquid crystal having a chiral smectic phase in a bulk state are aligned in a ferrielectric phase by the alignment films when said liquid crystal material is sealed between the first and second substrates, and the direction of the director of said liquid crystal layer is changed by applying a voltage thereto.

* * * * *